United States Patent
Yamada et al.

(10) Patent No.: US 9,776,926 B2
(45) Date of Patent: Oct. 3, 2017

(54) ZIRCONIA SINTERED BODY, AND ZIRCONIA COMPOSITION AND CALCINED BODY

(71) Applicant: KURARAY NORITAKE DENTAL INC., Kurashiki-shi (JP)

(72) Inventors: Yoshihisa Yamada, Miyoshi (JP); Atsushi Matsumoto, Miyoshi (JP); Yoshihisa Ito, Miyoshi (JP)

(73) Assignee: KURARAY NORITAKE DENTAL INC., Kurashiki-shi (JP)

( * ) Notice: Subject to any disclaimer, the term of this patent is extended or adjusted under 35 U.S.C. 154(b) by 0 days.

(21) Appl. No.: 14/774,429

(22) PCT Filed: Mar. 10, 2014

(86) PCT No.: PCT/JP2014/056205
§ 371 (c)(1),
(2) Date: Sep. 10, 2015

(87) PCT Pub. No.: WO2014/142080
PCT Pub. Date: Sep. 18, 2014

(65) Prior Publication Data
US 2016/0016853 A1    Jan. 21, 2016

(30) Foreign Application Priority Data

Mar. 11, 2013 (JP) ................................. 2013-048461

(51) Int. Cl.
*C04B 35/48*    (2006.01)
*C04B 35/49*    (2006.01)
(Continued)

(52) U.S. Cl.
CPC ............ *C04B 35/49* (2013.01); *C04B 35/486* (2013.01); *C04B 35/62645* (2013.01);
(Continued)

(58) Field of Classification Search
CPC ..... C04B 35/48; C04B 35/482; C04B 35/484; C04B 35/486; C04B 2235/3246
(Continued)

(56) References Cited

U.S. PATENT DOCUMENTS 4,742,030 A    5/1988 Masaki et al.
5,034,358 A *  7/1991 MacMillan ......... C23C 18/1208
                                                  427/376.2
(Continued)

FOREIGN PATENT DOCUMENTS

CN    102712542 A    10/2012
EP    0 218 853 A1    4/1987
(Continued)

OTHER PUBLICATIONS

Chen et al. Effect of precursor characteristics on zirconia and ceria particle morphology in spray pyrolysis. Ceramics International 34 (2008) 409-416.*

(Continued)

*Primary Examiner* — Noah Wiese
(74) *Attorney, Agent, or Firm* — Oblon, McClelland, Maier & Neustadt, L.L.P.

(57) ABSTRACT

A zirconia sintered body, where when cross-sectional area of each zirconia crystal-grain is calculated in image of cross section of zirconia sintered body, converted crystal-grain size of each zirconia crystal-grain is calculated based on cross-sectional area where each zirconia crystal-grain has circular cross-sectional shape, zirconia crystal-grains are classified into class of <0.4 μm, class of ≥0.4 and <0.76 μm, and class of ≥0.76 μm based on converted crystal-grain size, total cross-sectional area of zirconia crystal-grains is calculated in each of classes, and rate of cross-sectional area to total cross-sectional area of all zirconia crystal-grains whose cross-sectional area has been calculated is calculated in each (Continued)

class, rate of cross-sectional area of zirconia crystal-grains in class of <0.4 μm is 4% to 35%, rate of cross-sectional area of zirconia crystal-grains in class of ≥0.4 and <0.76 μm is 24% to 57%, and rate of cross-sectional area of zirconia crystal-grains in class of ≥0.76 μm-is 16% to 62%.

13 Claims, 10 Drawing Sheets

(51) Int. Cl.
  *C04B 35/486*    (2006.01)
  *C04B 35/626*    (2006.01)
  *C04B 35/64*     (2006.01)

(52) U.S. Cl.
  CPC ...... *C04B 35/64* (2013.01); *C04B 2235/3217* (2013.01); *C04B 2235/3225* (2013.01); *C04B 2235/3232* (2013.01); *C04B 2235/3418* (2013.01); *C04B 2235/5445* (2013.01); *C04B 2235/5454* (2013.01); *C04B 2235/5472* (2013.01); *C04B 2235/782* (2013.01); *C04B 2235/785* (2013.01); *C04B 2235/9653* (2013.01)

(58) Field of Classification Search
  USPC .......................................... 501/103, 104, 105
  See application file for complete search history.

(56) References Cited

U.S. PATENT DOCUMENTS

| | | | | |
|---|---|---|---|---|
| 5,723,393 | A * | 3/1998 | Majumdar | C04B 35/486 501/104 |
| 6,069,103 | A | 5/2000 | Kwon | |
| 6,168,680 | B1 * | 1/2001 | Takeuchi | C04B 35/486 156/89.11 |
| 7,608,552 | B2 * | 10/2009 | Meyer | C04B 35/46 106/35 |
| 8,841,223 | B2 * | 9/2014 | Jahns | A61K 6/0255 106/35 |
| 9,249,056 | B2 | 2/2016 | Fujisaki et al. | |
| 2010/0035747 | A1 | 2/2010 | Zhao et al. | |
| 2010/0290978 | A1 * | 11/2010 | Chun | B01J 4/002 423/445 R |
| 2011/0070441 | A1 | 3/2011 | Mikaki et al. | |
| 2011/0254181 | A1 | 10/2011 | Holand et al. | |
| 2012/0295113 | A1 | 11/2012 | Kurizoe et al. | |
| 2013/0190164 | A1 | 7/2013 | Ito et al. | |
| 2014/0145125 | A1 | 5/2014 | Yamashita et al. | |
| 2014/0227654 | A1 | 8/2014 | Fujisaki et al. | |
| 2014/0328746 | A1 | 11/2014 | Yamada et al. | |
| 2015/0035210 | A1 | 2/2015 | Holand et al. | |
| 2016/0016853 | A1 * | 1/2016 | Yamada | C04B 35/486 501/134 |

FOREIGN PATENT DOCUMENTS

| | | |
|---|---|---|
| EP | 0 351 827 A2 | 1/1990 |
| EP | 2 248 784 A1 | 11/2010 |
| EP | 2 377 506 A1 | 10/2011 |
| JP | 2007-332026 A | 12/2007 |
| JP | 2009-269812 A | 11/2009 |
| JP | 2010-150063 A | 7/2010 |
| JP | 2010-150064 A | 7/2010 |
| JP | 2011-073907 A | 4/2011 |
| JP | 2011-178610 A | 9/2011 |
| JP | 2012-041239 A | 3/2012 |
| WO | WO 2010/014849 A2 | 2/2010 |
| WO | WO 2012/023601 A1 | 2/2012 |
| WO | WO 2013/018728 A1 | 2/2013 |

OTHER PUBLICATIONS

Gaudon et al. Morphology and sintering behaviour of yttria stabilised zirconia (8-YSZ) powders synthesised by spray pyrolysis. Ceramics International 30 (2004) 2295-2303.*

Combined Office Action and Search Report issued Jul. 26, 2016 in Chinese Patent Application No. 201480014177.5 (with English translation of Categories of Cited Documents).

International Search Report issued on Jun. 10, 2014 for PCT/JP2014/056205 filed on Mar. 10, 2014.

Extended European Search Report issued Aug. 23, 2016 in Patent Application No. 14765463.6.

* cited by examiner

ZIRCONIA SINTERED BODY, AND ZIRCONIA COMPOSITION AND CALCINED BODY

TECHNICAL FIELD

Reference to Related Application

The present invention is based upon and claims the benefit of the priority of Japanese patent application No. 2013-048461 filed on Mar. 11, 2013, the disclosure of which is incorporated herein in its entirety by reference thereto.

The present invention relates to a zirconia sintered body. The present invention also relates to a composition and calcined boy for forming the zirconia sintered body.

BACKGROUND

In zirconium oxide (IV) ($ZrO_2$) (referred to as "zirconia" hereinafter), there are polymorphs, and phase transition occurs between the polymorphs. For example, tetragonal zirconia changes to monoclinic zirconia by the phase transition. Therefore, a tetragonal zirconia sintered body in which the phase transition is not suppressed does not have enough strength to be used as a product. The phase transition also causes volume change. Therefore, the tetragonal zirconia sintered body in which the phase transition is not suppressed can not be applied to a product having high accuracy of a size. The phase transition further causes lowering of durability of the zirconia sintered body.

Therefore, oxides such as yttrium oxide ($Y_2O_3$) (referred to as "yttria" hereinafter) are used as a stabilizer for suppressing the occurrence of the phase transition. The tetragonal zirconia which is partially stabilized by adding the stabilizer has been referred to as partially-stabilized zirconia (PSZ) and has been used in various fields. A sintered body of the partially-stabilized zirconia (referred to as "zirconia sintered body" hereinafter) has been used for dental prostheses, tools, etc.

Patent Literatures 1-3 disclose a zirconia sintered body that is especially used for dentistry. The zirconia sintered bodies disclosed in Patent literatures 1-3 contain 2-4 mol % yttria as a stabilizer, and have a relative density of 99.8% or higher and a total light transparence, as measured at a thickness of 1.0 mm, of 35% or higher.

Patent Literature 4 discloses a zirconia sintered body that contains one or more of yttria, calcia, magnesia and ceria; containing one or more kind(s) of a positive ion having a smaller ionic radius than that of a zirconium ion and/or a positive ion except for that having valence of 4; a rate of a monoclinic phase after immersed into hot water at a temperature of 140 degrees Celsius for 72 hours being 1% or less.

Patent Literature 5 discloses a zirconia sintered body that has partially-stabilized zirconia, as a matrix phase, including a stabilizer, wherein a standard deviation of a surface content of the stabilizer is 0.8 or higher when a region of 10 μm by 10 μm in a sample surface of the zirconia sintered body is divided into squares of 256 by 256, and the content of the stabilizer in each of the squares is expressed in wt %.

PATENT LITERATURE 1: JP Patent Kokai Publication No. JP2009-269812A
PATENT LITERATURE 2: JP Patent Kokai Publication No. JP2010-150063A
PATENT LITERATURE 3: JP Patent Kokai Publication No. JP2010-150064A
PATENT LITERATURE 4: JP Patent Kokai Publication No. JP2007-332026A
PATENT LITERATURE 5: JP Patent Kokai Publication No. JP2011-178610A

SUMMARY

The entire disclosures of the above Patent Literatures are incorporated herein by reference thereto. The following analyses are given in view of the present invention.

In order to utilize a zirconia sintered body as an industrial product, it is necessary to sufficiently suppress progress of phase transition. In the zirconia sintered bodies disclosed Patent Literatures 1-4, however, the suppression of the phase transition is insufficient. Therefore, in order to suppress the progress of the phase transition, it is considered that a content of a stabilizer is increased. However, by increasing the content of the stabilizer, flexural strength and fracture toughness decrease.

On the other hand, by decreasing the content of the stabilizer, although the flexural strength and fracture toughness can be enhanced, the suppression of the progress of the phase transition becomes insufficient. In addition, because there is generally a trade-off relationship between the flexural strength and the fracture toughness, it is difficult to enhance both the flexural strength and fracture toughness.

In view of aesthetic appearance, there is a case where suitable transparency depending on a purpose is necessary for an industrial product. As such a product, a dental material may be mentioned, for example. If the transparency of the zirconia sintered body is too low, the zirconia sintered body can not be used for the dental material. On the other hand, if the transparency of the zirconia sintered body is too high, some additive to decrease the transparency is added to the zirconia sintered body in order to adjust the transparency. However, the additive acts to enhance the phase transition of the zirconia sintered body. The additive also acts to decrease the strength of the zirconia sintered body. The zirconia sintered bodies disclosed in Patent Literatures 1-5 do not have the transparency suitable for the dental material.

Therefore, a zirconia sintered body in which the phase transition is suppressed and which has high flexural strength and fracture toughness and has suitable transparency is desired.

According to a first aspect of the present invention, a zirconia sintered body is provided, wherein, when a cross-sectional area of each zirconia crystal grain is calculated in an image of a cross section of the zirconia sintered body; a converted crystal grain size of each zirconia crystal grain is calculated based on the cross-sectional area on the assumption that each zirconia crystal grain has a circular cross-sectional shape; the zirconia crystal grains are classified into a class of smaller than 0.4 μm, a class of from 0.4 μm to smaller than 0.76 μm, and a class of 0.76 μm or greater based on the converted crystal grain size; a total cross-sectional area of the zirconia crystal grains is calculated in each of the classes; and a rate of the cross-sectional area to a total cross-sectional area of all zirconia crystal grains whose cross-sectional area has been calculated is calculated in each class, the rate of the cross-sectional area of the zirconia crystal grains in the class of the converted crystal grain size of smaller than 0.4 μm ranges from 4% to 35%, the rate of the cross-sectional area of the zirconia crystal grains in the class of the converted crystal grain size of from 0.4 μm to smaller than 0.76 μm ranges from 24% to 57%, and the rate of the cross-sectional area of the zirconia crystal grains in the class of the converted crystal grain size of 0.76 μm or greater ranges from 16% to 62%.

According to a second aspect of the present invention, a zirconia sintered body is provided, the zirconia sintered body having a flexural strength, measured in conformity with JISR1601, of 1000 MPa or higher; a fracture toughness, measured in conformity with JISR1607, of 3.5 MPa·m$^{1/2}$ or higher; and an optical transparency rate, measured in conformity with JISK7361, of 27% or higher; wherein, in an X-ray diffraction pattern of the zirconia sintered body after a hydrothermal treatment test on a condition at a temperature of 180 degrees Celsius and a pressure of 1 MPa for 5 hours, a ratio of a height of a peak existing near a position around 28° of 2θ where a [11-1] peak of (i.e., ascribed to) a monoclinic crystal appears to a height of a peak existing near a position around 30° of 2θ where a [111] peak of (i.e., ascribed to) a tetragonal crystal appears is 1 or lower.

The present invention has at least one of the following effects.

A zirconia sintered body of the present invention, in which phase transition may be sufficiently suppressed, may have high flexural strength and fracture toughness and have suitable transparency.

According to a composition and calcined body of the present invention, the zirconia sintered body as described above can be obtained.

PREFERRED MODES

Figure 1:
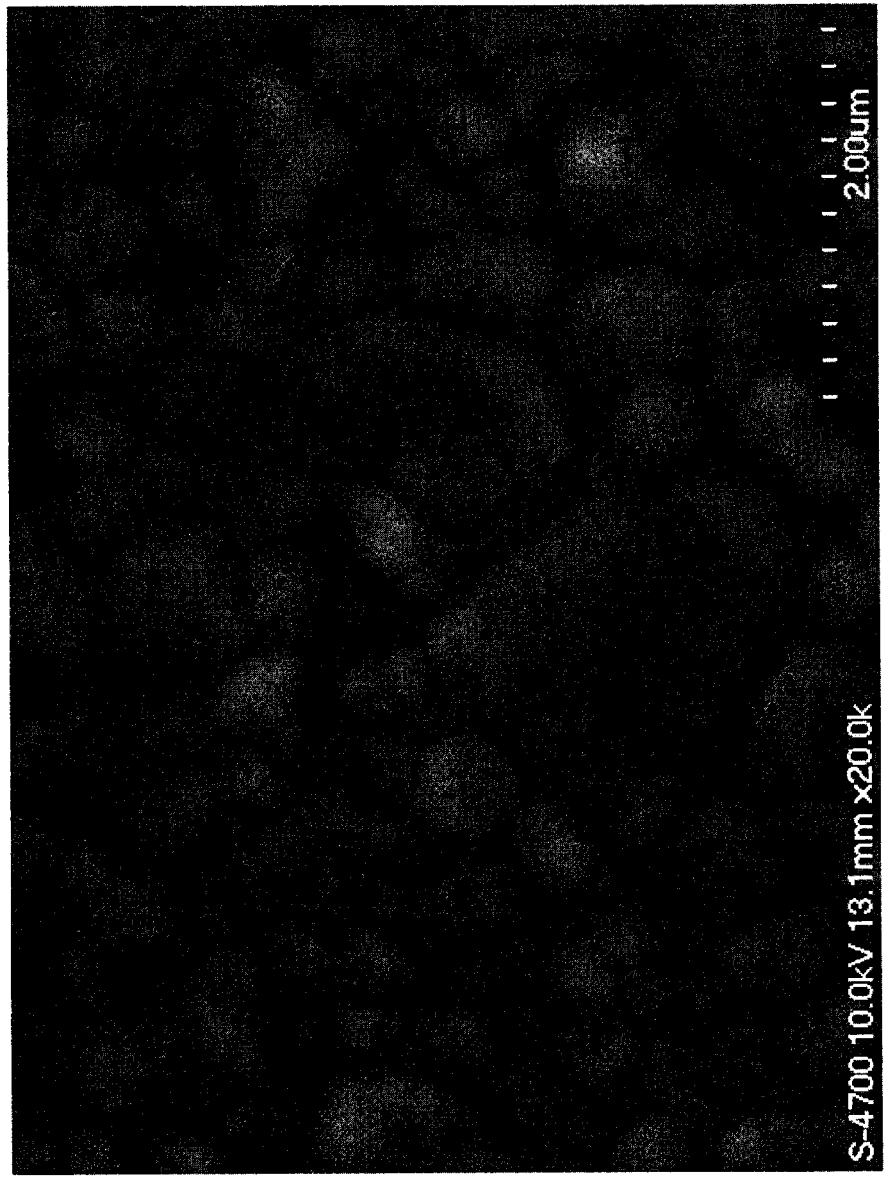
FIG. 1 is a SEM image of a cross-sectional surface of a zirconia sintered body in Example 1.

Preferred modes for the above aspects will be described below.

According to a preferred mode for the above first aspect, the zirconia sintered body has a flexural strength, measured in conformity with JISR1601, of 1000 MPa or higher.

According to a preferred mode for the above first aspect, the zirconia sintered body has a fracture toughness, measured in conformity with JISR1607, of 3.5 MPa·m$^{1/2}$ or higher.

According to a preferred mode for the above first aspect, in an X-ray diffraction pattern of the zirconia sintered body after a hydrothermal treatment test on a condition at a temperature of 180 degrees Celsius and a pressure of 1 MPa for 5 hours, a ratio of a height of a peak existing near a position around 28° of 2θ where a [11-1] peak of a monoclinic crystal appears to a height of a peak existing near a position around 30° of 2θ where a [111] peak of a tetragonal crystal appears is 1 or lower.

According to a preferred mode for the above first aspect, the zirconia sintered body has an optical transparency rate, measured in conformity with JISK7361, of 27% or higher.

According to a preferred mode for the above first aspect, the zirconia sintered body has L* value ranging from 55 to 75, a* value ranging from −5 to 10, and b* value ranging from −5 to 30 with regard to an Lab color space.

According to a third aspect, a composition for producing a zirconia sintered body according to the first and second aspects is provided, the composition being adapted for providing the zirconia sintered body by burning the composition at a temperature ranging from 1400 degrees Celsius to 1600 degrees Celsius.

According to a fourth aspect, a calcined body for producing a zirconia sintered body according to the first and second aspects is provided, the calcined body being adapted for providing the zirconia sintered body by burning the calcined body at a temperature ranging from 1400 degrees Celsius to 1600 degrees Celsius.

A zirconia sintered body of the present invention will be explained. The zirconia sintered body of the present invention is a sintered body in which partially-stabilized zirconia crystal particles are mainly (as a main component) sintered, and has the partially-stabilized zirconia as a matrix phase. In the zirconia sintered body of the present invention, a main crystal phase of zirconia is tetragonal. (In a state before a hydrothermal treatment test described below has not been applied), it is preferred that the zirconia sintered body has substantially no monoclinic crystal.

The zirconia sintered body of the present invention may include not only a sintered body made by sintering compacted (molded) zirconia particles under an ordinary condition (without applying pressure or under atmospheric pressure) but also a sintered body densified by a treatment that applies high pressure and high temperature, such as HIP (Hot Isostatic Pressing).

The zirconia sintered body of the present invention may comprise zirconia and its stabilizer. As an example of the stabilizer, oxides such as calcium oxide (CaO), magnesium oxide (MgO), yttria, cerium oxide ($CeO_2$) and/or the like may be mentioned. The stabilizer(s) is preferably added in an amount enough to partially stabilize the tetragonal zirconia particles. If yttria is used as the stabilizer, for example, the content of yttria may be preferably 2.5 mol % to 5 mol %, more preferably 3 mol % to 4.5 mol %, and further preferably 3.5 mol % to 4.5 mol % relative to the total mole of zirconia and yttria.

The zirconia sintered body of the present invention may preferably comprise aluminum oxide ($Al_2O_3$; alumina). Aluminum oxide is preferably α-alumina. By including aluminum oxide, strength can be enhanced. The content of aluminum oxide in the zirconia sintered body is preferably 0 wt %* (not included) to 0.3 wt % to the total weight of zirconia and the stabilizer. By including aluminum oxide of greater than 0.3 wt %, transparency decreases. [*Translation Note: "wt %" is used herein for "mass %" which is the original term.]

The zirconia sintered body of the present invention may preferably comprise titanium oxide ($TiO_2$; titania). By including titanium oxide, the growth of a grain can be promoted. The content of titanium oxide in the zirconia sintered body is preferably 0 wt % (not included) to 0.6 wt % to the total weight of zirconia and the stabilizer. By including titanium oxide of greater than 0.6 wt %, strength decreases.

In the zirconia sintered body of the present invention, the content of silicon oxide ($SiO_2$; silica) is preferably 0.1 wt % or less to the total weight of zirconia and the stabilizer, and it is preferred that the zirconia sintered body comprises substantially no silicon oxide. By including silicon oxide, the transparency of the zirconia sintered body decreases. In this case, the expression "comprises substantially no silicon oxide" means within a range (or extent) that will not give particular influence on the nature or characteristic of the present invention, and it is intended preferably not including silicon oxide beyond the level of impurities, and whereas it does not necessarily mean the content being less than a detection limit.

The zirconia sintered body of the present invention may further comprise a pigment(s) for coloring. As the pigment(s), oxide(s) may be mentioned, for example. The above contents are values without taking the presence of the pigment(s) into account.

An optical transparency rate of the zirconia sintered body of the present invention is preferably 27% or higher, more preferably 28% or higher, and further preferably 29% or higher when the rate is measured, in conformity with JISK7361, with a sample that has both sides finished like a mirror and has a thickness of 0.5 mm. If the zirconia sintered body is used as a dental material, the optical transparency rate of the zirconia sintered body is preferably 35% or lower.

In an X-ray diffraction pattern of the zirconia sintered body in a state after sintering and before applying a hydrothermal treatment test (described below), which is a degradation-acceleration test, the pattern being measured with CuKα rays, it is preferred that a ratio of a height of a peak existing near a position around 28° of 2θ where a [11-1] peak of the monoclinic crystal appears (referred to as a "first peak" hereinafter) to a height of a peak existing near a position around 30° of 2θ where a [111] peak of the tetragonal crystal appears (referred to as a "second peak" hereinafter) (that is, "(the height of the second peak)/(the height of the first peak)"; referred to as the "monoclinic peak ratio" hereinafter) is 0.1 or lower, and more preferably 0.05 or lower.

Even if the hydrothermal treatment test is applied to the zirconia sintered body of the present invention, progress of the phase transition from the tetragonal crystal to the monoclinic crystal can be suppressed. When the hydrothermal treatment is applied to the zirconia sintered body of the present invention on a condition of at a temperature of 180 degrees Celsius and a pressure of 1 MPa for five hours, for example, in the X-ray diffraction pattern, measured with CuKα rays, of the surface of the zirconia sintered body after the hydrothermal treatment, the monoclinic peak ratio is preferably 1 or lower, more preferably 0.8 or lower, more preferably 0.7 or lower, and further preferably 0.6 or lower.

In this description, the "hydrothermal treatment test" indicates a test in conformity with ISO13356. With the proviso, however, although ISO13356 provides the condition of "at a temperature of 134 degrees Celsius, at a pressure of 0.2 MPa, and for 5 hours", the corresponding condition in the prevent invention is modified to "at a temperature of 180 degrees Celsius and at a temperature of 1 MPa" to make the condition severer, and the test time is suitably determined according to a purpose. The hydrothermal treatment test may be also referred to as a "low-temperature degradation-acceleration test" or "hydrothermal degradation test".

A fracture toughness, measured in conformity with JISR1607, of the zirconia sintered body of the prevent invention is preferably 3.5 MPa·m$^{1/2}$ or higher, more preferably 3.8 MPa·m$^{1/2}$ or higher, and further preferably 4 MPa·m$^{1/2}$ or higher. These values relates to those measured in a state before the hydrothermal treatment test.

A flexural strength, measured in conformity with JISR1601, of the zirconia sintered body of the prevent invention is preferably 1000 MPa or higher, more preferably 1100 MPa or higher, and further preferably 1200 MPa or higher. These values relate to those measured in a state before the hydrothermal treatment test.

It is preferred that the zirconia sintered body of the present invention satisfies the above values about all of the optical transparency rate, the monoclinic peak ratio after the hydrothermal treatment, the flexural strength and the fracture toughness. The zirconia sintered body of the present invention preferably has the transparency rate of 27% or higher, the monoclinic peak ratio after the hydrothermal treatment of 1 or lower, the fracture toughness of 3.5 MPa·m$^{1/2}$ or higher and the flexural strength of 1000 MPa or higher, for example. More preferably, the zirconia sintered body of the present invention has the transparency rate of 28% or higher, the monoclinic peak ratio after the hydrothermal treatment of 0.6 or lower, the fracture toughness of 4 MPa·m$^{1/2}$ or higher and the flexural strength of 1100 MPa or higher.

With regard to an Lab color space of the zirconia sintered body of the present invention, if the zirconia sintered body is used for the dental material, an L* value is preferably 55 to 75. An a* value is preferably −5 to 10. A b* value is preferably −5 to 30.

A cross-sectional surface of the zirconia sintered body is observed with a scanning electron microscope (SEM), all zirconia crystal grains whose contour entirely appears (whose contour is not broken) are picked out. A cross-sectional area of each of the picked-out (or picked-up) crystal grains in the SEM image is calculated. A crystal grain size (diameter) on the assumption that the zirconia crystal grain has a circular shape in the SEM image is calculated based on the cross-sectional area of each crystal grain (the calculated crystal grain size is referred to as a "converted crystal grain size", hereinafter). If one crystal grain has the cross-sectional area of 0.5 μm$^2$ in the SEM image, the converted crystal grain size of the crystal grain on the assumption that the crystal grain has a circular shape is equal to 0.8 μm. Based on the converted crystal grain size, the crystal grains picked out in the SEM image are classified. A total of the cross-sectional areas of the crystal grains is calculated by the class. A rate of the total cross-sectional area of the crystal grains in each class to a total cross-sectional area of all crystal grains picked out in the SEM image is calculated. The cross-sectional rate of the crystal grains in a class of the converted crystal grain size of smaller than 0.4 μm preferably ranges from 4% to 35%, and more preferably from 7% to 20%. The cross-sectional rate of the crystal grains in a class of the converted crystal grain size ranging from 0.4 μm to smaller than 0.76 μm preferably ranges from 24% to 57%, and more preferably from 32% to 52%. The cross-sectional rate of the crystal grains in a class of the converted crystal grain size of 0.76 μm or greater preferably ranges from 16% to 62%, and more preferably from 37% to 57%. These values relate to those measured in a state before the hydrothermal treatment test.

Next, a composition and calcined body for producing the zirconia sintered body of the present invention will be explained. The composition and calcined body may serve to a precursor (intermediate product) for the above zirconia sintered body of the present invention. The calcined body relates to what is obtained by burning the composition at a low temperature insufficient for sintering.

The composition and calcined body comprise zirconia crystal particles, a stabilizer(s), and titanium oxide. The composition and calcined body may comprise aluminum oxide. Aluminum oxide is preferably α-alumina.

A particle size distribution of the zirconia crystal particles in the composition and calcined body has at least two peaks. In the particle size distribution, a first peak may preferably exist in a range of 0.05 μm to 0.11 μm, and more preferably in a range of 0.06 μm to 0.10 μm (small particle-size powder). A second peak may preferably exist in a range of 0.1 μm to 0.7 μm, and more preferably in a range of 0.2 μm to 0.6 μm (large particle-size powder). A mixing ratio of the small particle-size powder to the large particle-size powder may preferably ranges from 2:1 to 1:2, and more preferably from 1.5:1 to 1:1.5.

As an example of the stabilizer in the composition and calcined body, oxides such as calcium oxide (CaO), magnesium oxide (MgO), yttria, cerium oxide ($CeO_2$) and/or the like may be mentioned. The stabilizer(s) is preferably added in an amount enough to partially stabilize the tetragonal zirconia particles. If yttria is used as the stabilizer, for example, the content of yttria may be preferably 2.5 mol % to 4.5 mol %, more preferably 3 mol % to 4.5 mol %, and further preferably 3.5 mol % to 4.5 mol % to the total mole of zirconia and yttria.

The content of aluminum oxide in the composition and calcined body is preferably 0 wt % (not included) to 0.3 wt % to the total weight of zirconia crystal particles and the stabilizer(s). This purpose is to enhance the strength of the zirconia sintered body. By including aluminum oxide of greater than 0.3 wt %, the transparency of the zirconia sintered body decreases.

The content of titanium oxide in the composition and calcined body is preferably 0 wt % (not included) to 0.6 wt % to the total weight of the zirconia crystal particles and the stabilizer(s). This purpose is to provide grow of the grain of the zirconia crystal. By including titanium oxide of greater than 0.6 wt %, the strength of the zirconia sintered body decreases.

In the composition and calcined body of the present invention, the content of silicon oxide is preferably 0.1 wt % or less to the total weight of the zirconia crystal particles and the stabilizer(s), and it is preferred that the composition and calcined body comprise substantially no silicon oxide. By including silicon oxide, the transparency of the zirconia sintered body decreases. In this case, the expression "comprise substantially no silicon oxide" means within a range that will not provide particular influence on the nature or characteristic of the present invention, and it is intended preferably not including silicon oxide beyond the level of impurities, whereas it does not necessarily mean the content being less than a detection limit.

The composition of the present invention may include powder, a fluid in which the powder is added to solvent, and a compacted (molded) body made by compacting (molding) the powder to a desired shape. That is, the composition may be powdered or a paste or wet composition (that is, the composition may be present in a solvent and may include a solvent). The composition may include an additive such as a binder, pigment and/or the like. In the calculation of the above content, the weight of the additive such as solvent, binder and the like is not taken into consideration.

If the composition of the present invention is a compacted body, the compacted body may be formed by any shaping (compacting) method, may be formed by press molding, injection molding, and stereolithography, for example, and may be also formed by multi-step processing. A CIP (Cold Isostatic Pressing) treatment may be applied to the composition of the present invention to which the press molding has already been applied, for example.

The calcined body of the present invention may be prepared by burning the composition of the present invention at a temperature ranging from 800 degrees Celsius to 1200 degrees Celsius under an atmospheric pressure.

The zirconia sintered body of the present invention may be prepared by burning the calcined body of the present invention at a temperature ranging from 1350 degrees Celsius to 1600 degrees Celsius under an atmospheric pressure.

Next, an example of a process of manufacturing the composition, the calcined body and the sintered body of the present invention will be explained.

First, zirconia is pulverized to make zirconia powder. Before the pulverization, a stabilizer(s) may be added. At this process, large particle-size powder having greater mean particle size and small particle-size powder having smaller mean particle size are made. The large particle-size powder may preferably have a mean particle size of 0.1 μm to 0.7 μm, and more preferably 0.2 μm to 0.6 μm. The small particle-size powder may preferably have a mean particle size of 0.05 μm to 0.11 μm, and more preferably 0.06 μm to 0.10 μm. The large particle-size powder and small particle-size powder may be made and classified by changing pulverization time, for example. After pulverizing zirconia, the powders may be dried and burned at a temperature ranging from 900 degrees Celsius to 1100 degrees Celsius, for example.

Next, the large particle-size powder and the small particle-size powder may be mixed. A mixing ratio of the large particle-size powder to the small particle-size powder may range from 1:2 to 2:1. Titanium oxide, aluminum oxide, a binder, pigment and/or the like may be added to the zirconia powder and wet-mixed with the zirconia powder. If the stabilizer(s) is not added at the pulverization process, the stabilizer(s) may be added at this process. Next, the mixture may be dried with a spray drier or the like to form the composition of the present invention. The composition may be compacted (shaped) after drying.

The mean particle size, the particle size distribution, the mixing ratio of the large particle-size powder to the small particle-size powder of the zirconia powder are not limited to the above example.

If the calcined body is not formed, the zirconia sintered body of the present invention may be produced by burning the composition at a temperature ranging from 1400 degrees Celsius to 1600 degrees Celsius, preferably from 1450 degrees Celsius to 1550 degrees Celsius, to sinter the zirconia powder.

If the calcined body is formed, the calcined body may be formed by burning the composition at a temperature ranging from 800 degrees Celsius to 1200 degrees Celsius. Next, the zirconia sintered body of the present invention may be produced by burning the calcined body at a temperature ranging from 1400 degrees Celsius to 1600 degrees Celsius, preferably from 1450 degrees Celsius to 1550 degrees Celsius, to sinter the zirconia powder. Shaping may be performed in a state of the calcined body or after sintering.

The zirconia sintered body of the present invention may be produced by other method(s).

EXAMPLES

A zirconia sintered body was formed, and flexural strength, fracture toughness and a monoclinic peak ratio after hydrothermal treatment were measured. In some examples, a transparency rate or Lab color space of the zirconia sintered body was measured. Table 1 shows an addition rate of yttria as a stabilizer to zirconia, an addition rate of aluminum oxide, an addition rate of titanium oxide, and an addition rate of silicon oxide. In Examples 1-27, the zirconia sintered body was prepared using zirconia powder made by Noritake Company Limited. The addition rate of yttria indicates a rate to a total mole of zirconia and yttria. The addition rates of aluminum oxide, titanium oxide and silicon oxide indicate rates to a total weight of zirconia and yttria. Mean particle sizes of large particle-size powder and small particle-size powder are also shown. A sintering temperature at a time of forming the zirconia sintered body is further shown. In Examples 14-21, oxide(s) for coloring was added in a small amount. In Examples 1-27, the mixing ratio of the large particle-size powder to the small particle-size powder was 1:1.

As a comparative example, a zirconia sintered body was formed using commercially marketed zirconia powder, and the flexural strength, the fracture toughness, the monoclinic peak ratio after hydrothermal treatment, and the optical transparency rate were measured. In Comparative examples 1-6, the marketed zirconia powder was used as it was. In Comparative examples 1-13, any work for changing a particle size of the composition was not performed. In Comparative examples 1-6, the marketed zirconia powder formed secondary particles that were aggregate of primary particles, and therefore the mean particle size could not be measured. Table 2 shows released values (cataloged values) of the particle sizes of the zirconia powders used in Comparative examples 1-6. The zirconia powder used in Comparative example 1 was TZ-3YS made by Tosoh Corporation. The zirconia powder used in Comparative example 2 was TZ-4YS made by Tosoh Corporation. The zirconia powder used in Comparative example 3 was TZ-5YS made by Tosoh Corporation. The zirconia powders used in Comparative example 4 were TZ-3YS and TZ-5YS made by Tosoh Corporation. The zirconia powder used in Comparative examples 5-6 was Zpex made by Tosoh Corporation. The zirconia powder used in Comparative examples 7-13 was made by Noritake Company Limited. Table 2 shows an addition rate of yttria as a stabilizer to zirconia, an addition rate of aluminum oxide, an addition rate of titanium oxide, and an addition rate of silicon oxide in Comparative examples. In Comparative examples 1-6, all values except the inclusion rate of yttria in Comparative example 4 are based on released values (cataloged values) of the marketed products. Table 2 also shows a sintering temperature at a time of forming the zirconia sintered body. In Comparative example 4, the zirconia powder having the yttria inclusion rate of 4 mol % was prepared by mixing the zirconia powder having the yttria inclusion rate of 3 mol % and the zirconia powder having the yttria inclusion rate of 5 mol % in a weight ratio of 1:1.

Measurement results are shown in Tables 3 and 4. The flexural strength of the zirconia sintered body was measured in conformity with JISR1601. The fracture toughness of the zirconia sintered body was measured in conformity with JISR1607. The optical transparency rate of the zirconia sintered body was measured in conformity with JISK7361. Samples used for the measurement of the transparency rate had a thickness of 0.5 mm and both sides that were mirror-finished. The hydrothermal treatment test was conformed to ISO13356 on a condition of at a temperature of 180 degrees Celsius and a pressure of 1 MPa for 5 hours. After applying the hydrothermal treatment test, the X-ray diffraction pattern of the zirconia sintered body was measured with CuKα rays, and the monoclinic peak ratio, that is, the extent of the phase transition to the monoclinic crystal by the hydrothermal treatment test, was measured. The Lab color space was measured with a measuring apparatus CE100-DC/US made by Olympus Corporation after the zirconia sintered body was shaped into a disk having a diameter of 14 mm and a thickness of 1.2 mm and its both sides were ground (mirror-finished).

Referring to Comparative examples 1, 5, 6 and 9 in which the content of yttria was 3 mol %, although the flexural strength was 1000 MPa or higher, and the fracture toughness was about 4 MPa·m$^{1/2}$, the monoclinic peak ratio was 3 or higher. That is, it was found that, if the content of yttria is low, the flexural strength and fracture toughness can be enhanced, but the phase transition is easy to progress. On the other hand, referring to Comparative examples 2-4, 7, 8 and 10-12 in which the content of yttria was 4 mol % or higher, although the monoclinic peak ratio was 1 or less, the flexural strength was lower than 1000 MPa, and the fracture toughness was also lower than 4. That is, it was found that, if the content of yttria is high, the progress of the phase transition can be suppressed, but the flexural strength and fracture toughness become low.

According to Examples 1-12, however, the flexural strength could be 1000 MPa or higher, the fracture toughness could be 4 MPa·m$^{1/2}$ or higher, and the monoclinic peak ratio could be suppressed down to 1 or lower. Accordingly, according to the present invention, all of the flexural strength, the fracture toughness and the suppression of the phase transition could be enhanced. In addition, the degree of transparency could be also as good as those of Comparative examples.

In Example 13 and Comparative example 13, silicon oxide was added. In Example 13 in which the addition rate of silicon oxide was 0.1 wt %, the transparency rate was 27%, whereas, in Comparative example 13 in which the addition rate was 0.2 wt %, the transparency rate was 26%. Therefore, it was found that the addition rate of silicon oxide is preferably 0.1 wt % or lower.

The zirconia sintered bodies in Examples 1-10 and 13 were white, and the zirconia sintered bodies in Examples 11, 12 and 14-21 were brown. It was found that, even if the zirconia sintered body of the present invention is colored, the flexural strength, the fracture toughness and the suppression effect of the phase transition do not decrease.

TABLE 1

|  | Sintering temperature/ degrees Celsius | Large particle size/ μm | Small particle size/ μm | Y$_2$O$_3$/ mol % | Al$_2$O$_3$/ wt % | TiO$_2$/ wt % | SiO$_2$/ wt % |
|---|---|---|---|---|---|---|---|
| Example 1 | 1500 | 0.4 | 0.08 | 4 | 0.1 | 0.20 | — |
| Example 2 | 1500 | 0.4 | 0.08 | 4 | 0.1 | 0 | — |
| Example 3 | 1500 | 0.4 | 0.08 | 4 | 0.1 | 0.30 | — |

TABLE 1-continued

| | Sintering temperature/ degrees Celsius | Large particle size/ μm | Small particle size/ μm | Y₂O₃/ mol % | Al₂O₃/ wt % | TiO₂/ wt % | SiO₂/ wt % |
|---|---|---|---|---|---|---|---|
| Example 4 | 1500 | 0.4 | 0.08 | 4 | 0.1 | 0.35 | — |
| Example 5 | 1500 | 0.4 | 0.08 | 4 | 0.1 | 0.40 | — |
| Example 6 | 1500 | 0.4 | 0.08 | 4 | 0 | 0.15 | — |
| Example 7 | 1500 | 0.4 | 0.08 | 4 | 0.2 | 0.20 | — |
| Example 8 | 1500 | 0.4 | 0.08 | 4 | 0.1 | 0.40 | — |
| Example 9 | 1500 | 0.4 | 0.08 | 4 | 0.3 | 0.20 | — |
| Example 10 | 1500 | 0.4 | 0.08 | 4 | 0.1 | 0.60 | — |
| Example 11 | 1500 | 0.4 | 0.08 | 4 | 0.1 | 0.20 | — |
| Example 12 | 1500 | 0.4 | 0.08 | 4 | 0.1 | 0.20 | — |
| Example 13 | 1500 | 0.4 | 0.08 | 4 | 0.1 | 0.20 | 0.1 |
| Example 14 | 1500 | 0.4 | 0.08 | 4 | 0.1 | 0.20 | — |
| Example 15 | 1500 | 0.4 | 0.08 | 4 | 0.1 | 0.20 | — |
| Example 16 | 1500 | 0.4 | 0.08 | 4 | 0.1 | 0.20 | — |
| Example 17 | 1500 | 0.4 | 0.08 | 4 | 0.1 | 0.20 | — |
| Example 18 | 1500 | 0.4 | 0.08 | 4 | 0.1 | 0.20 | — |
| Example 19 | 1500 | 0.4 | 0.08 | 4 | 0.1 | 0.20 | — |
| Example 20 | 1500 | 0.4 | 0.08 | 4 | 0.1 | 0.20 | — |
| Example 21 | 1500 | 0.4 | 0.08 | 4 | 0.1 | 0.20 | — |
| Example 22 | 1500 | 0.4 | 0.08 | 4 | 0.1 | 0.20 | — |
| Example 23 | 1500 | 0.4 | 0.08 | 4 | 0.1 | 0.20 | — |
| Example 24 | 1500 | 0.4 | 0.08 | 4 | 0.1 | 0.20 | — |
| Example 25 | 1500 | 0.4 | 0.08 | 4 | 0.1 | 0.20 | — |
| Example 26 | 1500 | 0.4 | 0.08 | 4 | 0.1 | 0.20 | — |
| Example 27 | 1500 | 0.4 | 0.08 | 4 | 0.1 | 0.20 | — |

TABLE 2

| | Sintering temperature/ degrees Celsius | Large particle size/ μm | Small particle size/ μm | Y₂O₃/ mol % | Al₂O₃/ wt % | TiO₂/ wt % | SiO₂/ wt % |
|---|---|---|---|---|---|---|---|
| Comparative example 1 | 1500 | 0.09 | | 3 | 0.1 or lower | Not mentioned | 0.2 or lower |
| Comparative example 2 | 1500 | 0.04 | | 4 | 0.1 or lower | Not mentioned | 0.2 or lower |
| Comparative example 3 | 1500 | 0.04 | | 5 | 0.1 or lower | Not mentioned | 0.2 or lower |
| Comparative example 4 | 1500 | 0.04 | | 4 | 0.1 or lower | Not mentioned | 0.2 or lower |
| Comparative example 5 | 1500 | 0.04 | | 3 | 0.05 or lower | Not mentioned | 0.2 or lower |
| Comparative example 6 | 1450 | 0.04 | | 3 | 0.05 or lower | Not mentioned | 0.2 or lower |
| Comparative example 7 | 1550 | — | — | 4 | 0 | 0.075 | — |
| Comparative example 8 | 1550 | — | — | 4 | 0 | 0.30 | — |
| Comparative example 9 | 1500 | — | — | 3 | 0.1 | 0.20 | — |
| Comparative example 10 | 1500 | — | — | 5 | 0.1 | 0.40 | — |
| Comparative example 11 | 1500 | — | — | 5 | 0.1 | 0 | — |
| Comparative example 12 | 1500 | — | — | 6 | 0.1 | 0 | — |
| Comparative example 13 | 1500 | 0.4 | 0.08 | 4 | 0.1 | 0.20 | 0.2 |

TABLE 3

|  | Flexural strength/ MPa | Fracture/ toughness/ MPa·m$^{1/2}$ | Transparency rate/% | Monoclinic peak ratio | Color L* | a* | b* |
|---|---|---|---|---|---|---|---|
| Example 1 | 1231 | 4.3 | 30.0 | 0.60 | 73.74 | −1.75 | −0.59 |
| Example 2 | 1113 | 4.0 | 29.6 | 0.50 | — | — | — |
| Example 3 | 1127 | 4.0 | 29.6 | 0.57 | — | — | — |
| Example 4 | 1165 | 4.0 | 29.3 | 0.61 | — | — | — |
| Example 5 | 1147 | 4.0 | 29.3 | 0.58 | — | — | — |
| Example 6 | 1016 | 4.0 | 28.0 | 0.70 | — | — | — |
| Example 7 | 1202 | 4.0 | 27.0 | 0.60 | — | — | — |
| Example 8 | 1095 | 4.5 | 29.3 | 0.60 | — | — | — |
| Example 9 | 1230 | 4.2 | 28.0 | 0.52 | — | — | — |
| Example 10 | 1111 | 4.0 | 28.0 | 0.60 | — | — | — |
| Example 11 | 1200 | 4.1 | — | 0.60 | — | — | — |
| Example 12 | 1200 | 4.1 | — | 0.60 | — | — | — |
| Example 13 | 1195 | 4.3 | 27.0 | 0.58 | — | — | — |
| Example 14 | 1190 | 4.3 | — | 0.55 | 71.6 | −2.16 | 4.2 |
| Example 15 | 1201 | 4.3 | — | 0.57 | 67.2 | −1.37 | 12.35 |
| Example 16 | 1207 | 4.3 | — | 0.58 | 63.76 | 0.1 | 17.48 |
| Example 17 | 1200 | 4.3 | — | 0.57 | 75.76 | −1.42 | 5.69 |
| Example 18 | 1205 | 4.3 | — | 0.60 | 72.49 | 0.97 | 14.5 |
| Example 19 | 1195 | 4.3 | — | 0.59 | 68.9 | 2.04 | 17.48 |
| Example 20 | 1200 | 4.3 | — | 0.57 | 63.34 | 4.07 | 23.41 |
| Example 21 | 1205 | 4.3 | — | 0.60 | 58.15 | 7.36 | 26.21 |
| Example 22 | 1150 | 4.2 | 29.0 | 0.58 | — | — | — |
| Example 23 | 1218 | 4.3 | 28.0 | 0.54 | — | — | — |
| Example 24 | 1190 | 4.2 | 30.0 | 0.55 | — | — | — |
| Example 25 | 1201 | 4.3 | 27.0 | 0.57 | — | — | — |
| Example 26 | 1130 | 4.1 | 30.0 | 0.58 | — | — | — |
| Example 27 | 1220 | 4.3 | 27.0 | 0.57 | — | — | — |

TABLE 4

|  | Flexural strength/ MPa | Fracture/ toughness/ MPa·m$^{1/2}$ | Transparency rate/% | Monoclinic peak ratio | Color L* | a* | b* |
|---|---|---|---|---|---|---|---|
| Comparative example 1 | 1154 | 4.3 | 28.0 | 5.1 | — | — | — |
| Comparative example 2 | 838 | 3.2 | 30.9 | 0 | — | — | — |
| Comparative example 3 | 521 | 2.7 | 34.1 | 0 | — | — | — |
| Comparative example 4 | 424 | 3.7 | 30.7 | 0.37 | — | — | — |
| Comparative example 5 | 1157 | 3.8 | 29.9 | 4.6 | — | — | — |
| Comparative example 6 | 1133 | 3.6 | 29.1 | 0.38 | — | — | — |
| Comparative example 7 | 951 | 4.0 | 28.0 | 0.70 | — | — | — |
| Comparative example 8 | 882 | 4.0 | 28.0 | 0.75 | — | — | — |
| Comparative example 9 | 1201 | 4.0 | 26.9 | 3.5 | — | — | — |
| Comparative example 10 | 801 | 3.1 | 28.2 | 0 | — | — | — |
| Comparative example 11 | 654 | 3.6 | 29.9 | 0 | — | — | — |
| Comparative example 12 | 417 | 2.1 | 29.6 | 0 | — | — | — |
| Comparative example 13 | 1210 | 4.3 | 26.0 | 0.54 | — | — | — |

Figure 3:
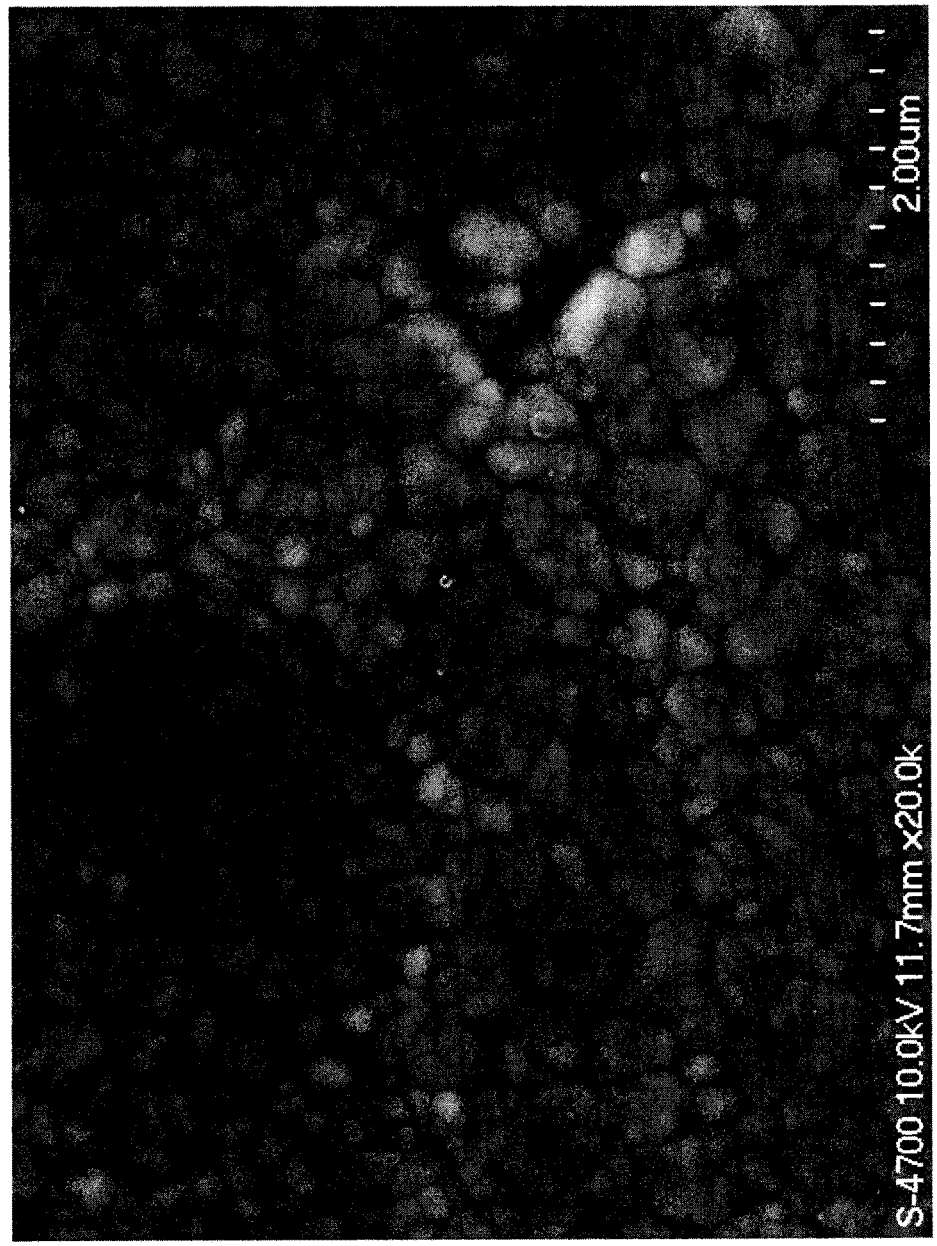
FIG. 3 is a SEM image of a cross-sectional surface of a zirconia sintered body in Comparative example 1.
Figure 5:
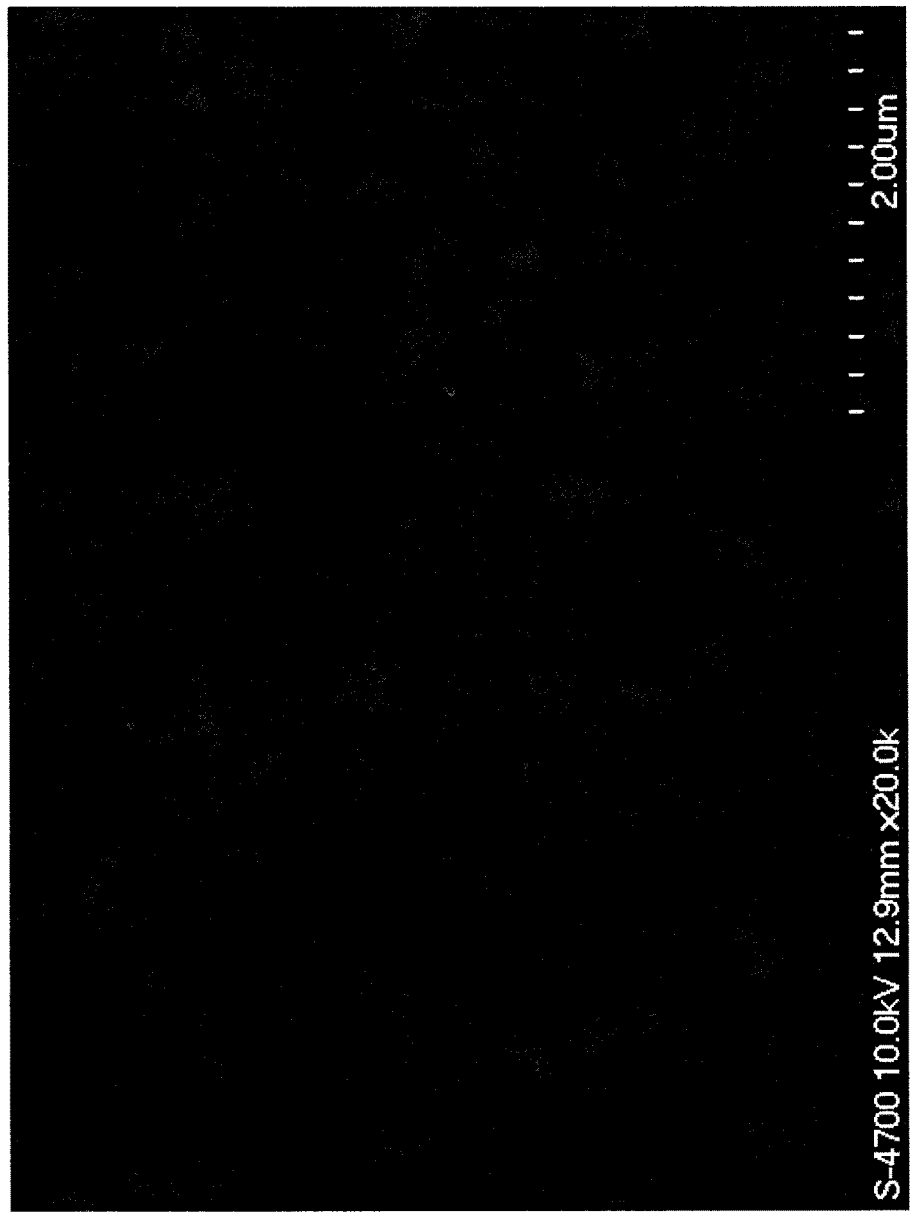
FIG. 5 is a SEM image of a cross-sectional surface of a zirconia sintered body in Comparative example 2.
Figure 7:
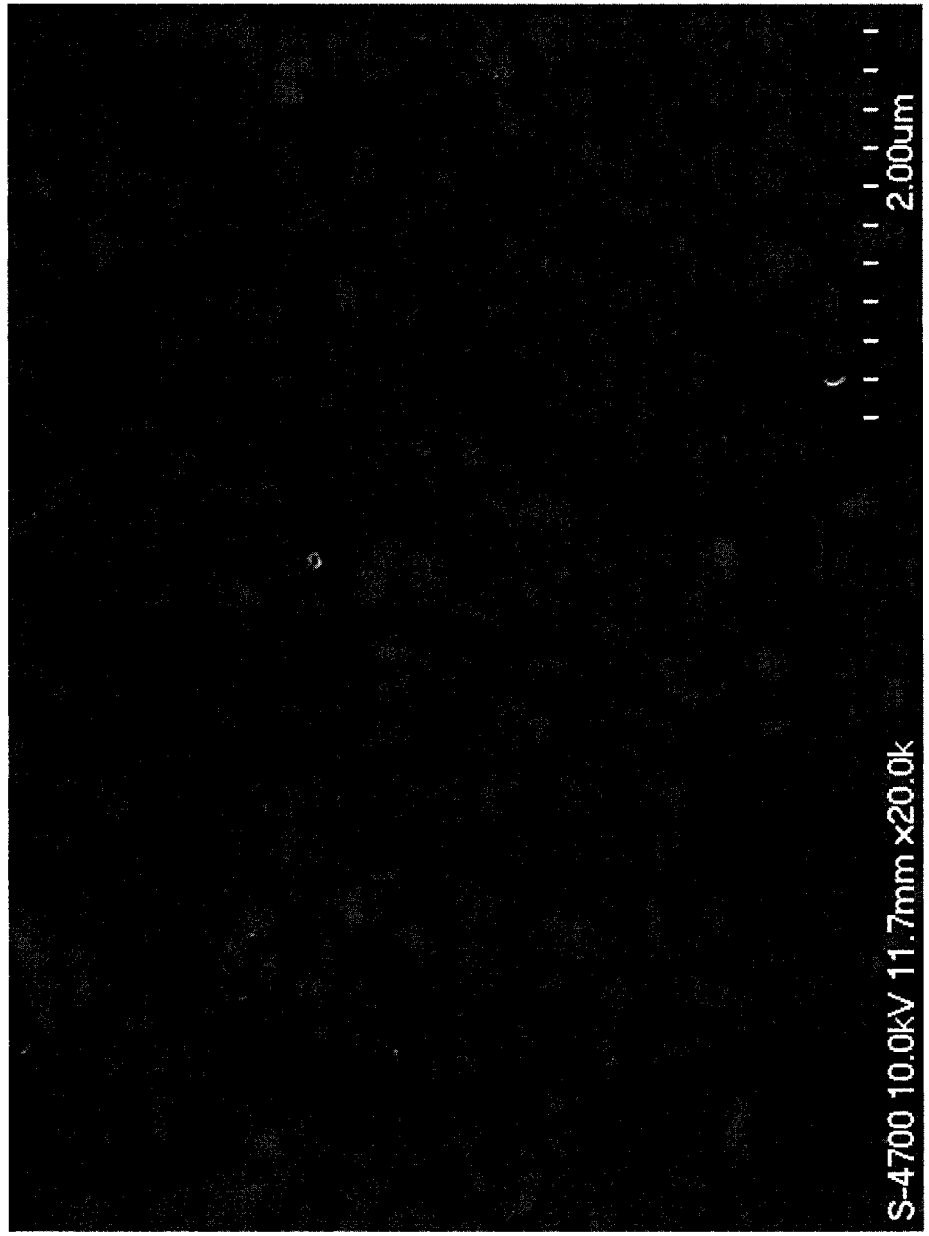
FIG. 7 is a SEM image of a cross-sectional surface of a zirconia sintered body in Comparative example 3.
Figure 9:
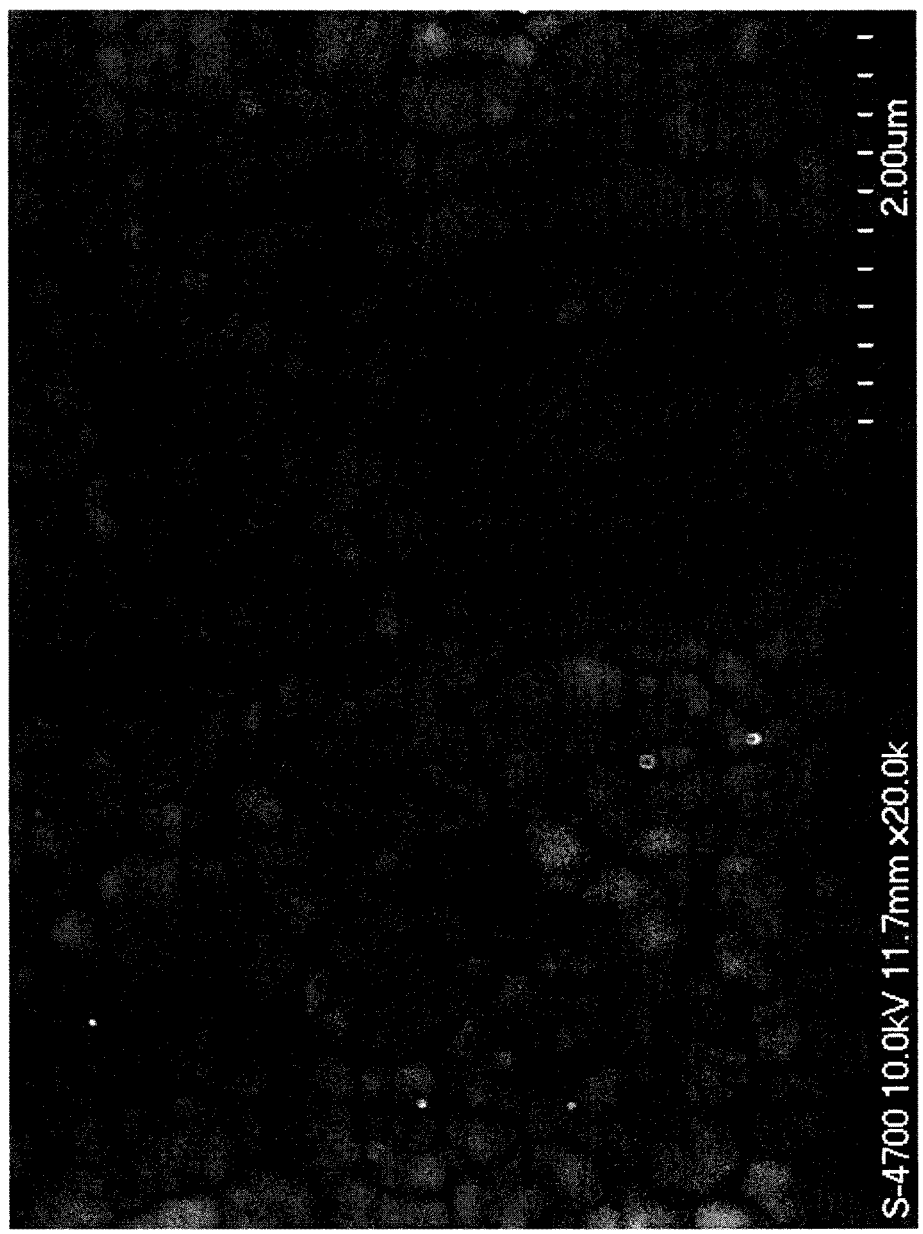
FIG. 9 is a SEM image of a cross-sectional surface of a zirconia sintered body in Comparative example 4.

SEM images of sectional surfaces of the zirconia sintered bodies made in Examples 1 and 22-27 and Comparative examples 1-4 were taken, crystal grains in the SEM images were classified, a total cross-sectional area was calculated in each of the classes, and the rate of the cross-sectional area was calculated. A field emission scanning electron microscope (FE-SEM) made by Hitachi High-Tech Fielding Corporation (S-4700) was used as an electron microscope. FIG. 1 shows a SEM image of the zirconia sintered body in Example 1. FIG. 3 shows a SEM image of the zirconia sintered body in Comparative example 1. FIG. 5 shows a SEM image of the zirconia sintered body in Comparative example 2. FIG. 7 shows a SEM image of the zirconia sintered body in Comparative example 3. FIG. 9 shows a SEM image of the zirconia sintered body in Comparative example 4. Magnification was 20,000 power in all images.

Figure 2:
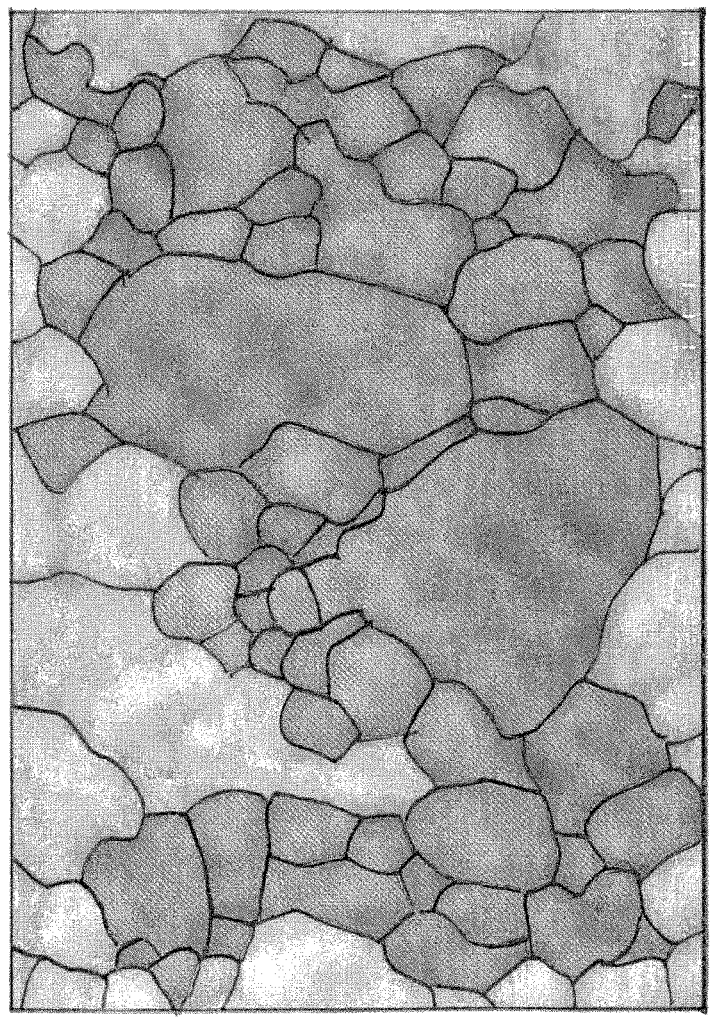
FIG. 2 shows zirconia crystal grains picked out in Example 1.
Figure 4:
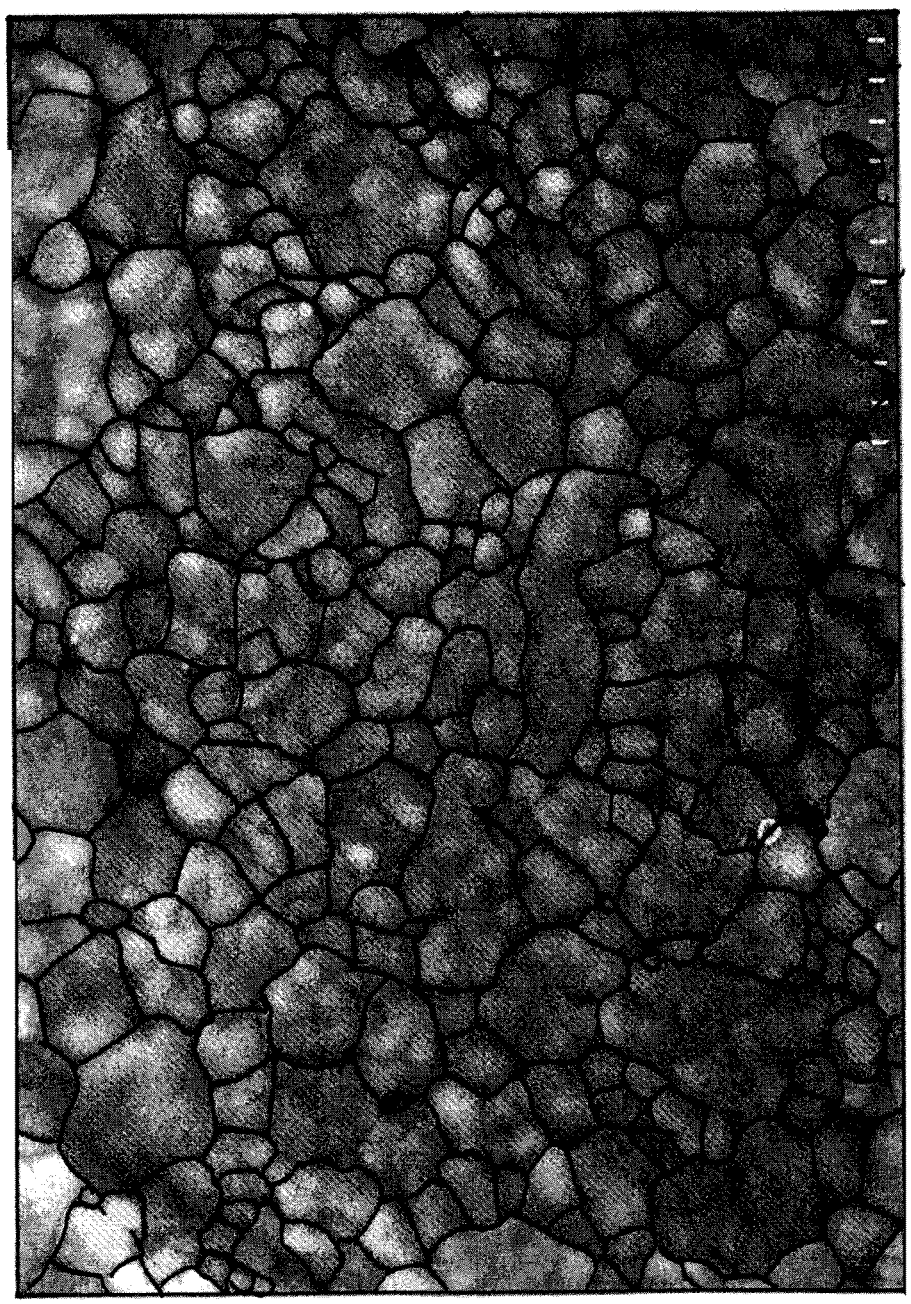
FIG. 4 shows zirconia crystal grains picked out in Comparative example 1.
Figure 6:
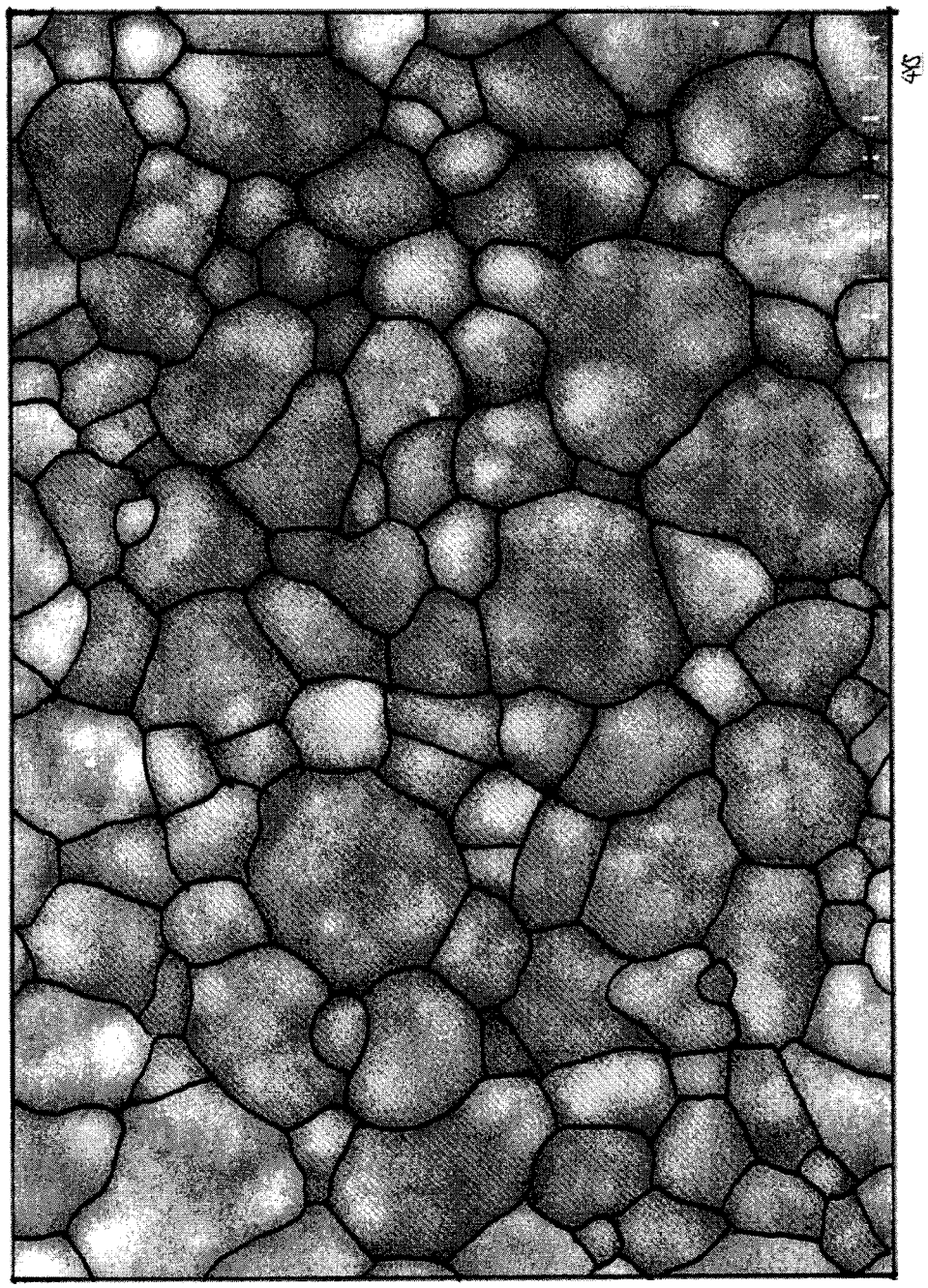
FIG. 6 shows zirconia crystal grains picked out in Comparative example 2.
Figure 8:
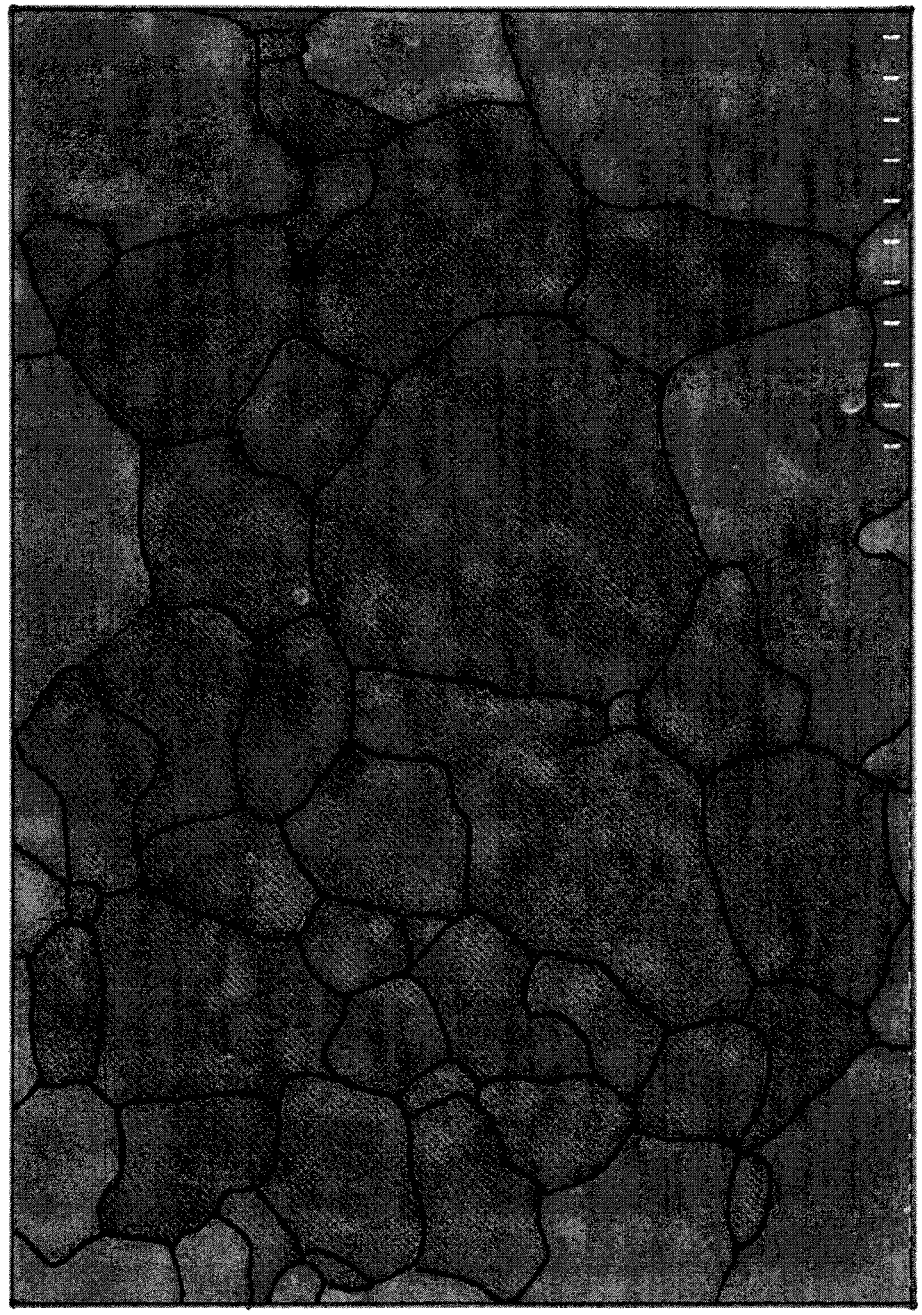
FIG. 8 shows zirconia crystal grains picked out in Comparative example 3.
Figure 10:
FIG. 10 shows zirconia crystal grains picked out in Comparative example 4.

In each SEM image, using an image analysis software (mac-view made by MOUNTECH Co., Ltd.), crystal grains whose contour was entirely projected (whose contour was not broken) on the image display were picked out, and the cross-sectional area of each zirconia crystal grain was calculated. FIG. 2 shows zirconia crystal grains picked out in Example 1. FIG. 4 shows zirconia crystal grains picked out in Comparative example 1. FIG. 6 shows zirconia crystal grains picked out in Comparative example 2. FIG. 8 shows zirconia crystal grains picked out in Comparative example 3. FIG. 10 shows zirconia crystal grains picked out in Comparative example 4. When the image analysis software did not automatically recognize the contour of the crystal grain, a treatment to recognize the contour of the crystal grain was applied. Based on the calculated cross-sectional area, a diameter (converted crystal grain size) was calculated on the assumption that the sectional surface of each zirconia crystal grain has a circular shape. The picked crystal grains were classified into a class of the diameter of smaller than 0.4 μm, a class of the diameter of from 0.4 μm to smaller than 0.76 μm, and a class of the diameter of 0.76 μm or greater based on the converted crystal grain size. This classification is based on whether or not the converted crystal grain size is within a range of visible light in wavelength. The total cross-sectional area of the zirconia crystal grains was calculated in each of the classes, and a rate of the cross-sectional area in each class to the total cross-sectional area of all zirconia crystal grains that were picked out was calculated. Table 5 shows calculation results.

In Comparative example 1, because the content of the stabilizer is low, a rate of the crystal grains having small cross-sectional area is high. Therefore, it is considered that the sintered body has high flexural strength and fracture toughness but the phase transition is easy to progress. In Comparative example 3, because the content of the stabilizer is high, there are more crystal grains having large cross-sectional area. Therefore, it is considered that the sintered body has low flexural strength and fracture toughness. In Comparative example 4, because the zirconia particles used in Comparative example 1 and the zirconia particles used in Comparative example 3 are mixed, the area rate is an intermediate value between that of Comparative example 1 and that of Comparative example 3. In Comparative example 4, because there are also more crystal grains having large cross-sectional area similarly to Comparative example 3, it is considered that the sintered body has low flexural strength and fracture toughness. Although the content of the stabilizer in Examples 1 and 22-27 is same as that in Comparative example 2, the area rate accounting for the crystal grains of from 0.4 μm to smaller than 0.76 μm is high in Comparative example 2, whereas, because a material having large particle size is mixed in Examples 1 and 22-27, the area rate accounting for the crystal grains of 0.76 μm or greater is high in Examples 1 and 22-27. Because the measurement results of Examples 1 and 22-27 is better than that of Comparative example 2, it is considered that a balance of the crystal grain size distribution or a balance of the area in the present invention works for enhancement of the flexural strength, the fracture toughness and the suppression of the phase transition.

TABLE 5

| Converted crystal grain size | Total area (Area rate) | | |
|---|---|---|---|
| | Smaller than 0.4 μm | From 0.4 μm to smaller than 0.76 μm | 0.76 μm or greater |
| Example 1 | 1.85 μm$^2$ (11%) | 7.28 μm$^2$ (42%) | 8.02 μm$^2$ (47%) |
| Example 22 | 0.96 μm$^2$ (5%) | 7.68 μm$^2$ (40%) | 10.56 μm$^2$ (55%) |
| Example 23 | 6.39 μm$^2$ (34%) | 9.02 μm$^2$ (48%) | 3.38 μm$^2$ (18%) |
| Example 24 | 5.88 μm$^2$ (28%) | 5.25 μm$^2$ (25%) | 9.87 μm$^2$ (47%) |
| Example 25 | 1.64 μm$^2$ (8%) | 11.48 μm$^2$ (56%) | 7.38 μm$^2$ (36%) |
| Example 26 | 2.72 μm$^2$ (15%) | 4.53 μm$^2$ (25%) | 10.86 μm$^2$ (60%) |
| Example 27 | 5.35 μm$^2$ (28%) | 10.70 μm$^2$ (56%) | 3.06 μm$^2$ (16%) |
| Comparative example 1 | 8.31 μm$^2$ (39%) | 9.97 μm$^2$ (46%) | 3.19 μm$^2$ (15%) |
| Comparative example 2 | 2.13 μm$^2$ (10%) | 12.42 μm$^2$ (58%) | 6.96 μm$^2$ (32%) |
| Comparative example 3 | 0.49 μm$^2$ (3%) | 4.07 μm$^2$ (23%) | 12.97 μm$^2$ (74%) |
| Comparative example 4 | 2.56 μm$^2$ (13%) | 4.4 μm$^2$ (23%) | 12.03 μm$^2$ (63%) |

Although the zirconia sintered body, and the composition (mixture), compact and calcined body for the zirconia sintered body of the prevent invention are explained based on the above embodiments and examples, the present invention is not limited to the above embodiments and examples, and may include any modification, change and improvement to disclosed various elements (including each element in the claims, each element in the embodiments and examples and each element in the drawings) based on the basic technical idea of the present invention within the scope of the present invention. Within the disclosure of the present invention, various combinations, displacements and selections of various disclosed elements (including each element in the claims, each element in the embodiments and examples and each element in the drawings) are available.

A further problem(s), object(s) and developed mode(s) of the present invention may be made clear from the entire disclosure, including the claims, of the present invention.

With regard to a numerical range(s) in the description, it should be interpreted that any value(s) and sub-range(s) that are included in the range are concretely disclosed even if not specially mentioned.

INDUSTRIAL APPLICABILITY

The zirconia sintered body of the present invention is available for various uses for dental materials such as prosthesis, connectors for optical fiber such as a ferrule and sleeve, various tools (crusher balls, cutting tools, for example), various parts (screws, bolts and nuts, for example), various sensors, components for electronics, accessories (straps for a watch, for example), etc. If the zirconia sintered body is used for the dental material, the zirconia sintered body may be used for a coping, a framework, a crown, a crown bridge, an abutment, an implant, an implant screw, an implant fixture, an implant bridge, an implant bar, a bracket, a dental plate, an inlay, an onlay, a wire for orthodontics, a laminate veneer, and the like.

The invention claimed is:

1. A zirconia sintered body, comprising titanium oxide, aluminum oxide, or both, wherein,
when a cross-sectional area of each zirconia crystal grain is calculated in an image of a cross section of the zirconia sintered body,
based on said cross-sectional area, a converted crystal grain size of each zirconia crystal grain is calculated on the assumption that each zirconia crystal grain has a circular cross-sectional shape, based on said converted crystal grain size, the zirconia crystal grains are classified into a class of smaller than 0.4 μm, a class of from 0.4 μm to smaller than 0.76 μm, and a class of 0.76 μm or greater, a total cross-sectional area of the zirconia crystal grains is calculated in each of the classes, and a rate of the cross-sectional area to a total cross-sectional area of all zirconia crystal grains whose cross-sectional area has been calculated is calculated in each class:

the rate of the cross-sectional area of the zirconia crystal grains in the class of said converted crystal grain size of smaller than 0.4 μm ranges from 4% to 35%;

the rate of the cross-sectional area of the zirconia crystal grains in the class of said converted crystal grain size of from 0.4 μm to smaller than 0.76 μm ranges from 24% to 57%; and the rate of the cross-sectional area of the zirconia crystal grains in the class of said converted crystal grain size of 0.76 μm or greater ranges from 16% to 62%.

2. The zirconia sintered body according to claim 1, having a flexural strength, measured in conformity with JISR1601, of 1000 MPa or higher.

3. The zirconia sintered body according to claim 1, having a fracture toughness, measured in conformity with JISR1607, of 3.5 MPa·m$^{1/2}$ or higher.

4. The zirconia sintered body according to claim 1, wherein, in an X-ray diffraction pattern of the zirconia sintered body after a hydrothermal treatment test on a condition at a temperature of 180 degrees Celsius and a pressure of 1 MPa for 5 hours, a ratio of a height of a peak existing near a position around 28° of 2θ where a peak of a monoclinic crystal appears to a height of a peak existing near a position around 30° of 2θ where a peak of a tetragonal crystal appears is 1 or lower.

5. The zirconia sintered body according to claim 1, having an optical transparency rate, measured in conformity with JISK7361, of 27% or higher.

6. A zirconia sintered body, comprising titanium oxide, aluminum oxide, or both, and having:

a flexural strength, measured in conformity with JISR1601, of 1000 MPa or higher;

a fracture toughness, measured in conformity with JISR1607, of 3.5 MPa·m$^{1/2}$ or higher; and an optical transparency rate, measured in conformity with JISK7361, of 27% or higher; wherein, in an X-ray diffraction pattern of the zirconia sintered body after a hydrothermal treatment test on a condition at a temperature of 180 degrees Celsius and a pressure of 1 MPa for 5 hours, a ratio of a height of a peak existing near a position around 28° of 2θ where a peak of a monoclinic crystal appears to a height of a peak existing near a position around 30° of 2θ where a peak of a tetragonal crystal appears is 1 or lower.

7. The zirconia sintered body according to claim 1, having L* value ranging from 55 to 75, a* value ranging from −5 to 10, and b* value ranging from −5 to 30 with regard to an Lab color space.

8. A calcined body, wherein the calcined body is suitable for producing the zirconia sintered body according to claim 1 by burning the calcined body at a temperature ranging from 1400 degrees Celsius to 1600 degrees Celsius.

9. The zirconia sintered body according to claim 1, further comprising yttria.

10. The zirconia sintered body according to claim 2, having a fracture toughness, measured in conformity with JISR1607, of 3.5 MPa·m$^{1/2}$ or higher.

11. A method for producing the zirconia sintered body according to claim 1, comprising:

preparing a first zirconia powder having a mean particle size of 0.1 μm to 0.7 μm;

preparing a second zirconia powder having a mean particle size of 0.05 μm to 0.11 μm;

making a composition by mixing said first zirconia powder with said second zirconia powder; and making the zirconia sintered body by burning said composition at a temperature ranging from 1400 degrees Celsius to 1600 degrees Celsius.

12. A method for producing the calcined body according to claim 8, comprising:

preparing a first zirconia powder having a mean particle size of 0.1 μm to 0.7 μm;

preparing a second zirconia powder having a mean particle size of 0.05 μm to 0.11 μm;

making a composition by mixing said first zirconia powder with said second zirconia powder; and making the calcined body by burning said composition at a temperature ranging from 800 degrees Celsius to 1200 degrees Celsius.

13. A method for producing a zirconia sintered body, comprising:

making a sintered body by burning the calcined body according to claim 8 at a temperature ranging from 1450 degrees Celsius to 1550 degrees Celsius.

* * * * *